United States Patent
Schwarz

(10) Patent No.: US 6,288,132 B1
(45) Date of Patent: Sep. 11, 2001

(54) ORGANIC GELS

(75) Inventor: Stephan Schwarz, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/749,969

(22) Filed: Dec. 28, 2000

Related U.S. Application Data

(60) Provisional application No. 60/176,435, filed on Jan. 14, 2000.

(51) Int. Cl.⁷ ........................................ C08J 9/40
(52) U.S. Cl. .................. 521/53; 521/64; 521/154; 521/181
(58) Field of Search ................ 521/64, 181, 53, 521/154

(56) References Cited

U.S. PATENT DOCUMENTS

| | | | |
|---|---|---|---|
| 4,873,218 | * 10/1989 | Pekala | 521/64 |
| 4,997,804 | * 3/1991 | Pekala | 521/64 |
| 5,081,163 | 1/1992 | Pekala . | |
| 5,088,085 | 2/1992 | Pekala . | |
| 5,484,818 | 1/1996 | De Vos et al. . | |
| 5,565,142 | * 10/1996 | Deshpande et al. | 252/62 |

* cited by examiner

*Primary Examiner*—Morton Foelak

(57) ABSTRACT

Silylated organic gels can be prepared by the removing substantially all of the water from polyhydroxy benzene-formaldehyde gels, followed by silylation. These silylated organic gel compositions comprise from about 0.01% to about 25% by weight silicon.

8 Claims, No Drawings

ORGANIC GELS

This application is a non-provisional of provisional application No. 60/176,435, which was filed on Jan. 14, 2000, which is now pending.

FIELD OF THE INVENTION

This invention relates to silylated organic gels and a method for the preparation of silylated organic gels.

BACKGROUND OF THE INVENTION

Two types of organic gels are known: xerogels and aerogels. The former are made by simple evaporation (usually with heating) of solvent from the pore system of the gel. These gels usually are denser and have lower porosity than aerogels. Aerogels can be prepared in a manner similar to that for preparing xerogels. However, in the preparation of aerogels, the solvent is driven off by using supercritical extraction/drying, freeze drying, or similar methods.

Aerogels have a variety of useful properties. In particular, aerogels are known for their superior insulation properties. These materials have minimal environmental impact since they are air-filled. Furthermore, they are not subject to aging. Aerogels are a singular category of ultrafine (pore sizes in the nanometer range) cell size, low density, open-celled foams. Aerogels have continuous porosity and their microstructure with pore sizes below the mean free path of air is believed to be responsible for their remarkable thermal properties.

Typical aerogels are inorganic, such as silica, alumina or zirconia aerogels, prepared by the hydrolysis and condensation of the corresponding alkoxides. Silica aerogels have been developed as super insulating materials, e.g., for double pane windows. Organic aerogels would be expected to have an even lower thermal conductivity and therefore, perform better in insulating applications by providing less heat loss.

During the past decade, several organic aerogels have been described. U.S. Pat. No. 4,997,804 and U.S. Pat. No. 4,873,218 disclose polyhydroxy benzene-formaldehyde aerogels. U.S. Pat. No. 5,086,085 and U.S. Pat. No. 5,081,163 disclose melamine-formaldehyde aerogels. U.S. Pat. No. 5,484,818 discloses polyisocyanate based organic aerogels. U.S. Pat. No. 5,565,142 discloses the preparation of high porosity xerogels by chemical surface modification by the reaction of a precursor gel with $R_xMX_y$, where R is an organic group, M is selected from the group consisting of Si and Al, and X is halogen.

Aerogels, whether organic or inorganic, are typically prepared in a solvent. Evaporation of the liquid from the wet gel is very complex. When usual drying procedures are used, the gel network cracks and collapses. To overcome these problems, the pore liquid is removed by supercritical drying (i.e., the solvent is removed in its supercritical state) at pressures from about 4 MPa to about 22 MPa depending on the solvent used. Freeze-drying has also been used, but the resulting aerogels have only been obtained as powders.

There is a need for methods to produce materials with the properties of aerogels more efficiently, and at lower pressures, preferably, atmospheric pressure. The present invention discloses organic gels prepared by methods similar to xerogel preparation techniques but which have high porosity and low density properties of aerogels. The process for preparing these gels is accomplished without employing supercritical drying or freeze drying techniques.

SUMMARY OF THE INVENTION

This invention provides a process for the preparation of silylated organic gels, comprising: (a) preparing gel comprising a polyhydroxy benzene-formaldehyde polymer; (b) removing substantially all water from the gel; (c) extracting the gel with a solvent in which a silylating agent is soluble; (d) treating the gel with the silylation agent; and (e) drying the treated gel.

The present invention further provides an organic gel comprising a polyhydroxy benzene-formaldehyde polymer made by the process described above.

DETAILED DESCRIPTION

Polyhydroxy benzene-formaldehyde gels are disclosed in U.S. Pat. No. 4,873,218 and U.S. Pat. No. 4,997,804, both of which are incorporated herein in their entirety by reference. The gels are prepared by mixing a polyhydroxy benzene, preferably, resorcinol (1,3-dihydroxybenzene) or mixtures of resorcinol and catechol (1,2-dihydroxybenzene), resorcinol and hydroquinone (1,4-dihydroxybenzene) or resorcinol and phloroglucinol (1,3,5-trihydroxy-benzene), with formaldehyde in the presence of a base catalyst.

Substantially all of the water is removed from the gel by extraction with a protic solvent (e.g., an alcohol) or an aprotic solvent (e.g., hexane, acetone or tetrahydrofuran). If the silylating agent of choice is not soluble in the extraction solvent, then a solvent in which the silylating agent is soluble (for example, acetone, toluene or tetrahydrofuran) is used to further extract the gel to remove the first solvent. The extracted gel is then silylated by stirring the gel in a solution of a solvent, for example, hexane and a silylating agent. The molar ratio of silylating agent:polyhydroxy benzene-formaldehyde gel is between from about 0.1:1 to about 2:1, preferably 0.1:1 to about 1.5:1.

Suitable silylating agents include organosilanes, organosilylamines, and organosilazanes. Examples of suitable silanes include chlorotrimethylsilane $(CH_3)_3SiCl$), dichlorodimethylsilane $((CH_3)_2SiCl_2)$, bromochlorodimethylsilane $((CH_3)_2SiBrCl)$, chlorotriethylsilane $((C_2H_5)_3SiCl)$ and chlorodimethyl-phenylsilane $((CH_3)_2Si(C_6H_5)Cl)$. Examples of suitable silazanes include 1,2-diethyldisilazane $(C_2H_5SiH_2NHSiH_2C_2H_5)$, 1,1,2,2-tetramethyldisilazane $((CH_3)_2SiHNHSiH(CH_3)_2)$, 1,1,1,2,2,2-hexamethyldisilazane $((CH_3)_3SiNHSi(CH_3)_3)$, 1,1,2,2-tetraethyldisilazane $(C_2H_5)_2SiHNHSiH(C_2H_5)_2$ and 1,2-diisopropyldisilazane $((CH_3)_2CHSiH_2NHSiH_2CH(CH_3)_2)$.

Preferred silylating agents include silazanes, N,O-bis (trimethylsilyl)-acetamide $(CH_3C(OSi(CH_3)_3)=NSi(CH_3)_3$ and N,O-bis(trimethylsilyl)-trifluoroacetamide $(CF_3C(OSi(CH_3)_3)=NSi(CH_3)_3)$.

The process of the present invention is performed at ambient pressure conditions. Treating the gel with the silylating agent can be performed at from ambient temperature to solvent reflux temperature. The gel is separated from the solvent, washed with a solvent, and then dried at a temperature of from between ambient temperature and 130° C. The silylated organic gel made by the process of the present invention comprises from about 0.01% to about 25% by weight silicon.

The process of present invention solves the problem of having to use supercritical pressures when preparing organic gels. The present invention teaches the preparation of organic gels at ambient pressure conditions.

The compositions disclosed in the present invention are useful as chromatographic separation media, ion exchange media, as catalysts, insulators (including thermal insulators). In addition, the compositions of the present invention may be used to prepare silicon carbide composites and silicon carbide/carbon composites.

EXAMPLES

Legend

BSTFA is $CF_3C(OSi(CH_3)_3)=NSi(CH_3)_3$ BSA is $CH_3C(OSi(CH_3)_3)=NSi(CH_3)_3$

BET is Brunauer-Emmett-Teller SA is surface area

BJH is Barrett-Joyner-Halenda APD is average pore diameter

PV is pore volume Wt % is weight %

General

The general procedure for the preparation of polyhydroxy benzene-formaldehyde gels is disclosed in U.S. Pat. No. 4,997,804, which is incorporated herein in its entirety by reference. For all the examples the resorcinol:$Na_2CO_3$ molar ratio was 75:1; the resorcinol:formaldehyde molar ratio was 0.5:1 and the resorcinol:deionized water ratio was 0.25:1 g/mL.

Example 1

Gel Preparation

Resorcinol (8.26 g) and formaldehyde (12.17 g, 37 wt % in water) were added to deionized water (33.03 mL) containing $Na_2CO_3·H_2O$ (0.12 g). The solution was maintained at room temperature for 24 hours; then heated to 50° C. and maintained at that temperature for 24 hours; and finally heated to 90° C. and maintained at that temperature for 72 hours. The resulting glassy gel was placed into a Soxhlet extractor and extracted twice for 24 hours, each time with ethanol. This gel was then extracted twice for 24 hours with hexane.

Silylation

A BSTFA solution was prepared by dissolving BSTFA (57.9 g) in a sufficient quantity of hexane to bring the total volume to 500 mL. The wet resorcinol-formaldehyde gel (21.5 g) was suspended in the BSTFA solution (250 mL) and stirred for 24 hours at room temperature. The liquid phase was removed, replaced with hexane and stirred at room temperature for 24 hours. The hexane wash was repeated, followed by air drying the gel at room temperature for 6 hours and finally vacuum drying at room temperature for 18 hours. The product was a mixture of a brown dust (-1A) and brown glass (-1B).

Example 2

The procedure was the same as that of Example 1 except that the BSTFA treatment was done at refluxing hexane temperature. The product again was a mixture of a brown dust (-2A) and brown glass (-2B).

Comparative Example A

A resorcinol-formaldehyde gel was prepared as described in the Example 1 gel preparation, except that the reagent amounts were doubled. Data presented in Table 1 was obtained before silylation.

Example 3

One-half of the sample prepared in Comparative Example A was used to prepare this sample. The wet resorcinol-formaldehyde gel was suspended in a BSTFA solution (57.9 g BSTFA made up to 500 mL with hexane) and maintained at room temperature with occasional stirring with a spatula. The silylated gel was sampled at 1, 2, 4, 8, 24, 48, 72 and 144 hours.

All samples were washed twice with hexane at room temperature for 24 hours. The final sample was washed once with ethanol at room temperature for 24 hours. The samples were then air dried at room temperature for 6 hours and then vacuum dried at room temperature for 18 hours. The product samples were brown glasses.

Example 4

One-half of the sample prepared in Comparative Example A was used to prepare this sample. The wet resorcinol-formaldehyde gel was suspended in a BSA solution (45.77 g BSA made up to 500 mL with hexane) and maintained at room temperature with occasional stirring with a spatula. The silylated gel was sampled at 1, 2, 4, 8, 24, 48, 72 and 144 hours.

All samples were washed twice with hexane at room temperature for 24 hours, the final sample was washed once with ethanol at room temperature for 24 hours. The samples were then air dried at room temperature for 6 hours and then vacuum dried at room temperature for 18 hours. The product samples were brown glasses.

TABLE 1

| Ex. | BET SA $m^2/g$ | BJH SA $m^2/g$ | BJH PV cc/g | BJH APD nm | wt % Si |
|---|---|---|---|---|---|
| 1A | 694 | 887 | 0.89 | 4.0 | 0.04 |
| 1B | 657 | 847 | 0.83 | 3.9 | 0.8 |
| 2A | 708 | 942 | 1.02 | 4.3 | 0.11 |
| 2B | 719 | 967 | 1.03 | 4.3 | 1.35 |
| A | 560 | 469 | 0.36 | 3.1 | 0 |
| 3 (1 h) | 467 | 603 | 0.52 | 3.4 | 0.28 |
| 3 (24 h) | 505 | 657 | 0.56 | 3.4 | 0.89 |
| 3 (144 h) | 477 | 520 | 0.43 | 3.3 | 0.73 |
| 4 (1 h) | 102 | 163 | 0.12 | 2.9 | 0.05 |
| 4 (24 h) | 136 | 197 | 0.16 | 3.3 | 0.15 |
| 4 (144 h) | 571 | 670 | 0.55 | 3.3 | 3.41 |

From the data in the table it can be seen that the silylation treatment increases the surface area and pore volume over the untreated gel, for the Examples 1 and 2 samples. For the Examples 3 and 4 samples only pore volume is increased over the unsilylated sample (A) at sufficiently long treatment times. Comparison of the Examples 3 and 4 with the Examples 1 and 2 shows that reaction at higher temperatures and continuous stirring enhance porosity.

Comparative Example B

A resorcinol-formaldehyde gel was prepared as described in the Example 1 gel preparation. Data was obtained prior to silylation then half of the sample was used to prepare Example 5 and the other half was used to prepare Example 6.

Example 5

A BSTFA solution was prepared from BSTFA (57.94 g) and hexane (500 mL). In the hood, under a slight flow of $N_2$, the wet resorcinol-formaldehyde gel was added to the BSTFA solution. The mixture was heated to reflux and samples were taken at 24, 48, 72, 96 and 168 hours. All of the samples were washed twice with hexane at room temperature for 24 hours. The final sample was washed once with ethanol at room temperature for 24 hours. The solids were vacuum dried at room temperature for 18 hours. The product samples were brown glasses, without the production of dust.

Example 6

A BSA solution was prepared from BSA (45.78 g) and hexane (500 mL). In the hood, under a slight flow of $N_2$, the wet resorcinol-formaldehyde gel was added to the BSA solution. The mixture was heated to reflux and samples were taken at 24, 48, 72, 96 and 168 hours. All the samples were washed twice with hexane at room temperature for 24 hours. The final sample was washed once with ethanol at room temperature for 24 hours. The solids were vacuum dried at room temperature for 18 hours. The product samples were brown glasses, without the production of dust.

TABLE 2

| Ex. | BET SA $m^2/g$ | BJH SA $m^2/g$ | BJH PV cc/g | BJH APD nm | wt % Si |
|---|---|---|---|---|---|
| B | 632 | 558 | 0.47 | 3.3 | 0 |
| 5 (24 h) | 593 | 782 | 0.74 | 3.8 | 2.8 |
| 5 (48 h) | 592 | 783 | 0.74 | 3.8 | 2.35 |
| 5 (72 h) | 619 | 800 | 0.8 | 4.0 | 3.28 |
| 5 (96 h) | 619 | 809 | 0.81 | 4.0 | 2.93 |
| 5 (168 h) | 497 | 440 | 0.33 | 3.0 | 1.44 |
| 6 (24 h) | 623 | 842 | 0.88 | 4.2 | 4.95 |
| 6 (48 h) | 618 | 841 | 0.89 | 4.2 | 5.7 |
| 6 (72 h) | 630 | 856 | 0.89 | 4.1 | 5.48 |
| 6 (96 h) | 631 | 862 | 0.89 | 4.1 | 8.19 |
| 6 (168 h) | 582 | 637 | 0.52 | 3.3 | 4.6 |

A comparison of Examples 5 and 6 (reflux preparation) with Examples 3 and 4 (room temperature preparation) shows that the higher temperature treatment promotes superior porosity.

Example 7
Resorcinol-formaldehyde gel preparation

The gel was prepared as described in Comparative Example A except that it was only aged at room temperature for 50 hours, giving a dark orange, rubbery gel.

A 10 g portion of the gel was washed twice with ethanol for 24 hours and twice with hexane for 24 hours, giving a light brown powder. The powder was contacted under reflux for 96 hours with 125 mL of a BSA solution (45.78 g BSA made up to 500 mL with hexane). The liquid phase was decanted and each solid was stirred in 1 L hexane for 24 hours at room temperature. The solid was air-dried at room temperature for 24 hours and then at room temperature in vacuo for 24 hours.

Example 8

A 10 g portion of the resorcinol-formaldehyde gel prepared as in Example 7 was washed twice with isopropanol for 24 hours and twice with hexane for 24 hours, giving a medium brown powder with some darker solid. The powder was contacted under reflux for 96 hours with 125 mL of a BSA solution (45.78 g BSA made up to 500 mL with hexane). The liquid phase was decanted and each solid was stirred in 1 L hexane for 24 hours at room temperature. The solid was air-dried at room temperature for 24 hours and then at room temperature in vacuo for 24 hours.

Comparative Example C

A 10 g portion of the gel prepared as described in Comparative Example A except that this sample was aged at room temperature for 50 hours, giving a dark orange, rubbery gel was washed 4 times with hexane for 24 hours, giving a gummy orange-brown material. The powder was contacted under reflux for 96 hours with 125 mL of a BSA solution (45.78 g BSA made up to 500 mL with hexane). The liquid phase was decanted and each solid was stirred in 1 L hexane for 24 hours at room temperature. The solid was air-dried at room temperature for 24 hours and then at room temperature in vacuo for 24 hours.

Comparative Example D

A 10 g portion of the gel prepared as described in Comparative Example A except that this sample was aged at room temperature for 50 hours, giving a dark orange, rubbery gel was washed twice with $H_2O$ for 24 hours, then once with isopropanol for 24 hours and finally twice with hexane for 24 hours, giving a dark brown material. The powder was contacted under reflux for 96 hours with 125 mL of a BSA solution (45.78 g BSA made up to 500 ML with hexane). The liquid phase was decanted and each solid was stirred in 1 L hexane for 24 hours at room temperature. The solid was air-dried at room temperature for 24 hours and then at room temperature in vacuo for 24 hours.

TABLE 3

| Ex. | BET SA $m^2/g$ | BJH SA $m^2/g$ | BJH PV cc/g | PJH APD nm | wt % Si |
|---|---|---|---|---|---|
| 7 | 345 | 406 | 0.47 | 4.6 | 13.7 |
| 8 | 400 | 484 | 0.42 | 3.5 | 20.3 |
| C | 2.4 | 1.5 | 0.014 | 37.4 | 0.019 |
| D | 4.4 | 4.3 | 0.014 | 13.3 | 0.018 |

The samples prepared in Examples 7 and 8 yielded brown powders. The lower porosity, but higher Si-incorporation should be noted.

What is claimed is:

1. A process for the preparation of silylated organic gels, comprising:

(a) preparing a gel comprising a polyhydroxy benzene-formaldehyde polymer;

(b) removing substantially all water from the gel;

(c) extracting the gel with a solvent in which a silylating agent is soluble;

(d) treating the gel with the silylating agent; and (e) drying the treated gel.

2. The process of claim 1 wherein the molar ratio of silylating agent:polyhydroxy benzene-formaldehyde polymer is between from about 0.1:1 to about 2:1.

3. The process of claim 1 wherein said silylating agent is selected from the group consisting of organosilanes, organosilylamines and organosilazanes.

4. The process of claim 3 wherein said silylating agent is selected from the group consisting of chlorotrimethylsilane, dichlorodimethylsilane, bromochlorodimethylsilane, chlorotriethylsilane, chlorodimethylphenylsilane, 1,2-diethyldisilazane,1,1,2,2-tetramethyldisilazane, 1,1,1,2,2,2-hexamethyldisilazane,1,1,2,2-tetraethyldisilazane, 1,2-diisopropyldisilazane, N,O-bis(trimethylsilyl)acetamide and N,O-bis(trimethylsilyl)trifluoroacetamide.

5. The process of claim 1 wherein water is removed by solvent extraction, wherein said solvent is protic or aprotic.

6. The process of claim 1 wherein said drying in step (e) is done at a temperature of from about ambient to about 130° C.

7. The process of claim 1 wherein said process is done at ambient pressure.

8. A composition of matter made by the process of claim 1.

* * * * *